United States Patent
Sanghai et al.

(10) Patent No.: US 9,805,142 B2
(45) Date of Patent: Oct. 31, 2017

(54) RANKING SUGGESTIONS BASED ON USER ATTRIBUTES

(71) Applicant: Google Inc., Mountain View, CA (US)

(72) Inventors: Sumit Kumar Sanghai, Bangalore (IN); Dandapani Sivakumar, Cupertino, CA (US); Pranav Kumar Tiwari, Bangalore (IN); Raghunandan Hulikal Keshavan, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 241 days.

(21) Appl. No.: 14/250,504

(22) Filed: Apr. 11, 2014

(65) Prior Publication Data

US 2015/0294029 A1    Oct. 15, 2015

(51) Int. Cl.
*G06F 17/30* (2006.01)

(52) U.S. Cl.
CPC .... *G06F 17/30973* (2013.01); *G06F 17/3064* (2013.01); *G06F 17/30867* (2013.01)

(58) Field of Classification Search
CPC ............. G06F 17/30672; G06F 17/30973
See application file for complete search history.

(56) References Cited

U.S. PATENT DOCUMENTS

| | | | |
|---|---|---|---|
| 7,756,855 B2 | 7/2010 | Ismalon | |
| 7,774,003 B1* | 8/2010 | Ortega | H04W 4/02 455/414.3 |
| 8,027,964 B2 | 9/2011 | Boulis | |
| 8,027,990 B1 | 9/2011 | Mysen et al. | |
| 8,316,019 B1 | 11/2012 | Ainslie et al. | |
| 8,321,404 B1 | 11/2012 | Mysen et al. | |
| 8,412,699 B1 | 4/2013 | Mukherjee et al. | |
| 8,412,728 B1 | 4/2013 | Roskind | |
| 8,515,951 B2 | 8/2013 | Tong et al. | |
| 8,515,954 B2 | 8/2013 | Gibbs et al. | |
| 8,515,975 B1 | 8/2013 | Federici | |
| 8,577,913 B1 | 11/2013 | Hansson et al. | |
| 2009/0019002 A1* | 1/2009 | Boulis | G06F 17/3064 707/3 |
| 2009/0119289 A1* | 5/2009 | Gibbs | G06F 17/3064 707/5 |

(Continued)

FOREIGN PATENT DOCUMENTS

| WO | 2013015811 | 1/2013 |
|---|---|---|
| WO | 2014014374 | 1/2014 |

OTHER PUBLICATIONS

International Search Report and Written Opinion of PCT Serial No. PCT/US15/25442 Jul. 7, 2015.

*Primary Examiner* — Neveen Abel Jalil
*Assistant Examiner* — Dawaune Conyers
(74) *Attorney, Agent, or Firm* — Middleton Reutlinger

(57) ABSTRACT

Methods and apparatus for ranking suggestions for input of a user based on one or more attributes of the user that are associated with one or more of the suggestions. User attributes of the user's user profile may be matched to user attributes of a suggestion and the suggestion ranked based at least in part on bias measures associated with the matched user attributes of the suggestion. Some implementations are directed to determining, for each of a plurality of suggestions, multiple user attributes and associated bias measures to associate with the suggestion.

30 Claims, 6 Drawing Sheets

(56) References Cited

U.S. PATENT DOCUMENTS

| | | | |
|---|---|---|---|
| 2011/0167077 A1* | 7/2011 | Govani | G06F 17/3087 |
| | | | 707/767 |
| 2013/0031106 A1 | 1/2013 | Schechter et al. | |
| 2013/0282682 A1* | 10/2013 | Batraski | G06F 17/30864 |
| | | | 707/706 |

* cited by examiner

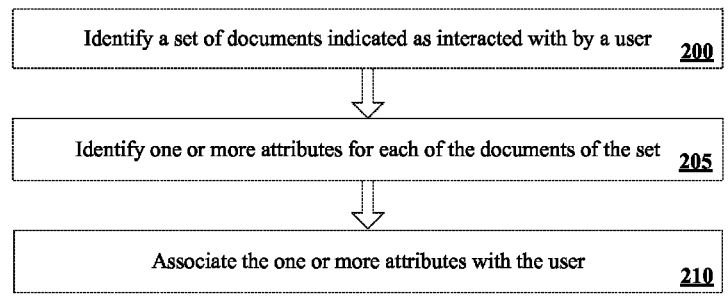
FIG. 2
| Indicated Interactions<br>($D_x$=Document Identifier, #=Quantity of Interactions, $A_x$=Document Attribute) | User Attributes<br>($A_x$=Attribute, #=Attribute Weight) |
|---|---|
| <($D_1$,50,$A_1$), ($D_2$,20,$A_2$), ($D_3$,10,$A_3$), ($D_4$, 5,$A_4$), ($D_5$, 2,$A_4$)><br>152A | <($A_1$,50), ($A_2$,20), ($A_3$,10), ($A_4$,7)><br>156A |
FIG. 3
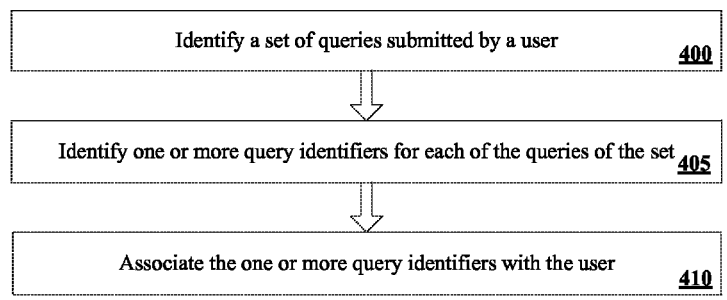
FIG. 4

RANKING SUGGESTIONS BASED ON USER ATTRIBUTES

BACKGROUND

Information retrieval systems, such as Internet search engines, enable users to locate information in a large database. For example, Internet search engines enable users to access information such as web pages, images, text documents, and/or multimedia content in response to a search query submitted by a user consisting of one or more search terms.

Some information retrieval systems, and/or other systems, may provide one or more query suggestions to a user as the user is typing or otherwise inputting a query and/or after a user has submitted a query. The user may choose one of the query suggestions to utilize as a submitted query and/or to utilize as the basis for a submitted query (e.g., by modifying, adding to, and/or subtracting from the selected query suggestion). The query suggestions are often generated via past user queries and/or generated automatically.

SUMMARY

This specification is directed generally to ranking suggestions, and, more particularly, to ranking query suggestions for a query (e.g., a partial query) of a user based on one or more attributes of the user that are associated with one or more of the query suggestions. Some implementations are directed generally to determining, for each of a plurality of query identifiers, multiple user attributes and associated bias measures to associate with the query identifiers. As described herein, a query identifier may identify a single query (e.g., the query "snow skiing"), a set of queries (e.g., the queries "snow skiing" and "skiing in the snow"), and/or one or more features of queries (e.g., the keyword "skiing", the keyword "snow", and/or the entity associated with the activity of snow skiing). Generally, a bias measure for a user attribute of a query identifier indicates a likelihood of submission of one or more queries identified by the query identifier by users having that user attribute. In some implementations, a bias measure for the user attribute may be determined based on: a measure of submissions of one or more queries related to the query identifier by users having the user attribute; and/or the weights of the user attribute among users who submitted the one or more queries. In some implementations, a user attribute for a query identifier may be determined based on one or more documents and/or locations interacted with by users who submitted one or more queries related to the query identifier—optionally including one or more documents and/or locations that are not responsive to, and/or otherwise related to, the queries related to the query identifier. In some of those implementations, a bias measure for the user attribute for the query may be determined based on a measure of the indicated interactions with the one or more documents or locations by the users who submitted one or more queries related to the query identifier.

Some implementations are directed generally to ranking query suggestions for a query of a user based on the user attributes associated with the query suggestions, and based on a user profile of the user. For example, a query suggestion may be ranked based on matching user attributes of the user's user profile to user attributes of the query suggestion, and ranking the query suggestion based at least in part on bias measures for the query suggestion that are associated with the matched user attributes. Also, for example, a query suggestion may additionally and/or alternatively be ranked based on matching user attributes of the user's user profile to user attributes of the query suggestion, and ranking the query suggestion based at least in part on bias measures for one or more past queries submitted by the user that are associated with the matched user attributes.

In some implementations a computer implemented method may be provided that includes the steps of: identifying suggestions for an input of a user, each of the suggestions including one or more characters not present in the input; identifying one or more user attributes associated with the user; identifying, for a given suggestion of the suggestions, a set of one or more of the user attributes that are each associated with the given suggestion; identifying, for each of the user attributes of the set, a bias measure for the given suggestion, wherein the bias measure for a given user attribute of the set is based on a measure of submissions associated with the given suggestion by a set of users having indicated interactions associated with the given user attribute; determining an overall bias measure for the given suggestion based on the bias measures for the user attributes of the set; and determining a ranking of the given suggestion for the input based on the overall bias measure.

This method and other implementations of technology disclosed herein may each optionally include one or more of the following features.

In some implementations, the bias measure for the given user attribute of the set is based on a measure of the indicated interactions associated with the given user attribute by the set of users. In some of those implementations, the given user attribute of the set is associated with one or more documents or locations and the set of users having indicated interactions with the given user attribute includes users having indicated interactions with the one or more documents or locations. The measure of the indicated interactions associated with the given user attribute by the set of users may be based on one or more popularity measures of the one or more documents or locations. The measure of the indicated interactions by the set of users may be based on comparison of the indicated interactions to additional indicated interactions, the additional indicated interactions including interactions with additional documents or locations that are not included in the one or more documents or locations.

In some implementations, the method further includes: identifying a submission of the given suggestion by the user; identifying additional suggestions for a second input of the user, wherein the second input is subsequent to the submission of the given suggestion; identifying, for a second given suggestion of the additional suggestions, a second set of one or more of the user attributes that are each associated with the second given suggestion, wherein the second set includes one or more overlapping attributes of the user attributes that are also included in the set; and determining a second overall bias measure for the second given suggestion, wherein the second overall bias measure is based on the bias measures for the overlapping attributes.

In some of those implementations, the method further includes: identifying, for each of the user attributes of the second set, a second bias measure for the second given query suggestion; wherein determining the second overall bias measure for the second given query suggestion is further based on the second bias measures. In some of those implementations, the given user attribute is included in the second set and the second bias measure for the given user attribute is based on a measure of submissions associated with the second given suggestion by the set of users having the indicated interactions associated with the given user attribute. In some of those implementations, the second bias measures for the second given suggestion and the bias measures for the overlapping attributes are weighted evenly in determining the second overall bias measure for the second given suggestion. In some of those implementations, the second bias measures for the second given suggestion are weighted more heavily than the bias measures for the overlapping attributes in determining the second overall bias measure for the second given suggestion.

In some implementations, the method further includes: identifying, for a second suggestion of the suggestions, an additional set of one or more of the user attributes that are each associated with the second suggestion; identifying, for each of the user attributes of the additional set, a second suggestion bias measure for the second suggestion; determining a second suggestion overall bias measure for the second suggestion based on the second suggestion bias measures for the user attributes of the additional set; and determining a ranking of the second suggestion based on the second suggestion overall bias measure. In some of those implementations, one or more of the user attributes of the set are not present in the additional set. In some of those implementations, the set and the additional set include one or more same of the user attributes.

In some implementations, the input is a partial query.

In some implementations a computer implemented method may be provided that includes the steps of: identifying a query submitted by a user; identifying one or more user attributes associated with the user; identifying, for the query, a set of one or more of the user attributes that are each associated with the query; identifying, for each of the user attributes of the set, a bias measure for the query, wherein the bias measure for a given user attribute of the set is based on a measure of submissions associated with the query by a set of users having the given user attribute; identifying query suggestions for a second query of the user, wherein the second query is subsequent to the query and wherein each of the query suggestions includes one or more characters not present in the query; identifying, for a given query suggestion of the query suggestions, a second set of one or more of the user attributes that are each associated with the given query suggestion, wherein the second set includes one or more overlapping attributes of the user attributes that are also included in the set; determining an overall bias measure for the given query suggestion, wherein the overall bias measure is based on the bias measures for the overlapping attributes; and determining a ranking of the given query suggestion for the second query based on the overall bias measure.

This method and other implementations of technology disclosed herein may each optionally include one or more of the following features.

In some implementations, a given user attribute of the set is associated with one or more documents and the bias measure for the given user attribute of the set is based on a measure of indicated interactions by the set of users with the one or more documents. In some of those implementations, the measure of the indicated interactions by the set of users with the one or more documents is based on one or more popularity measures of the one or more documents. In some of those implementations, the measure of the indicated interactions by the set of users with the one or more documents is based on comparison of the indicated interactions to additional indicated interactions, the additional indicated interactions including interactions with additional documents that are not included in the one or more documents.

In some implementations, the method further includes: identifying, for each of the user attributes of the second set, a second bias measure for the given query suggestion; wherein determining the second overall bias measure is further based on the second bias measures. In some of those implementations, the given user attribute is included in the second set, and the second bias measure for the given user attribute is based on a measure of submissions associated with the given query suggestion by the set of users having the given user attribute. In some of those implementations, the second bias measures for the given query suggestion and the bias measures for the overlapping attributes are weighted evenly in determining the overall bias measure for the given query suggestion. In some of those implementations, the second bias measures for the given query suggestion are weighted more heavily than the bias measures for the overlapping attributes in determining the overall bias measure for the given query suggestion.

In some implementations, one or more of the user attributes of the set are not present in the second set.

In some implementations, determining the overall bias measure based on the bias measures for the overlapping attributes is dependent on the second query and the query being part of a query session.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

Particular implementations of the subject matter described herein rank query suggestions for a query of a user. The query suggestions are ranked based on one or more identified user attributes of the user and bias measures for the query suggestions that are associated with the identified user attributes. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 is a flow chart illustrating an example method of determining user attributes for a user based on a set of documents indicated as interacted with by the user.

FIG. 3 is an example of indicated interactions and user attributes determined based on the indicated interactions.

FIG. 4 is a flow chart illustrating an example method of determining query identifiers associated with a user based on a set of queries submitted by the user.

DETAILED DESCRIPTION

Figure 1:
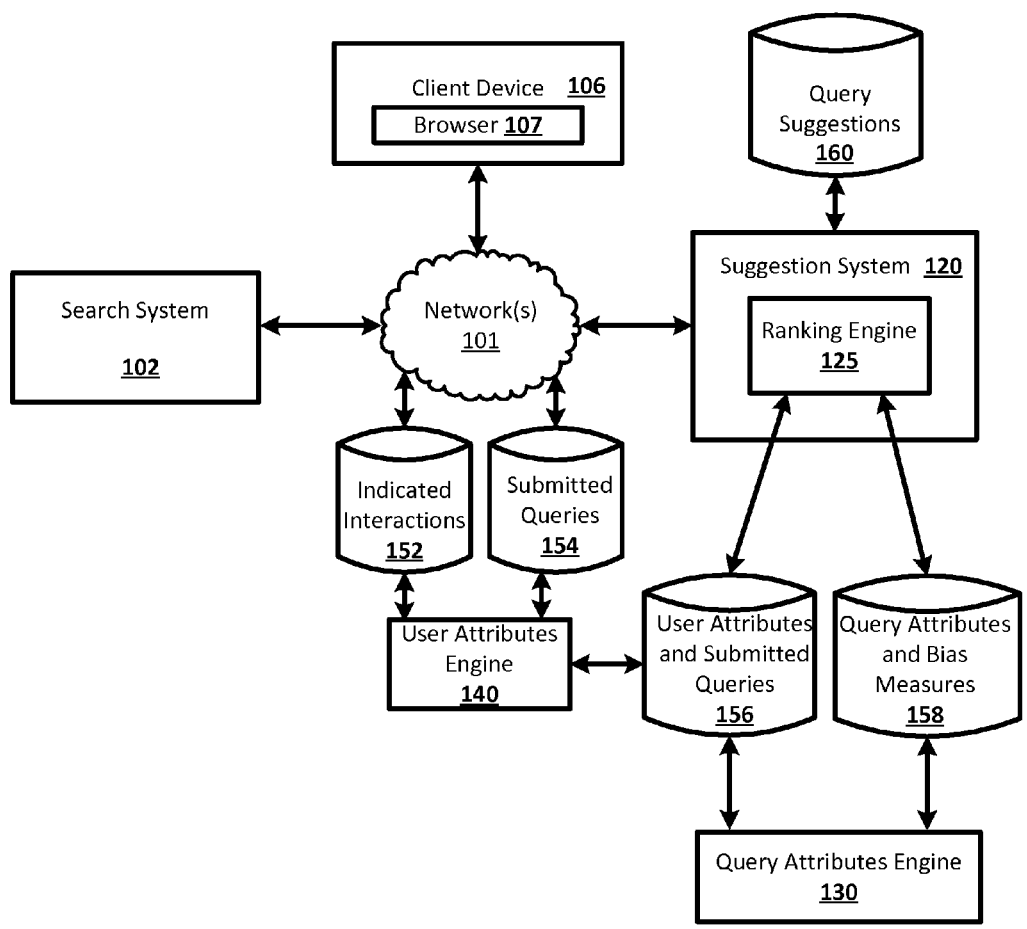
FIG. 1 illustrates an example environment in which query suggestions may be ranked based on user attributes.

FIG. 1 illustrates an example environment in which query suggestions may be ranked based on user attributes. The example environment includes a client device 106, a suggestion system 120, and a search system 102. The suggestion system 120 can be implemented in one or more computers that communicate, for example, through a network. The suggestion system 120 is an example of a system in which the systems, components, and techniques described herein may be implemented and/or with which systems, components, and techniques described herein may interface.

Generally, the suggestion system 120 identifies one or more query suggestions for a query and ranks one or more of the identified query suggestions. The suggestion system 120 includes a ranking engine 125 that calculates scores for query suggestions identified as responsive to a query using one or more ranking signals, and ranks the query suggestions based on the scores. As described herein, one ranking signal for a query suggestion of a query may include information about the relationship between one or more user attributes associated with the user entering the query and one or more user attributes associated with the query suggestion. For example, the ranking engine 125 may rank the query suggestion based on matching user attributes of the user's user profile to user attributes of the query suggestion, and calculating a score for the query suggestion based at least in part on bias measures for the query suggestion that are associated with the matched user attributes. Also, for example, the ranking engine 125 may additionally and/or alternatively rank a query suggestion based on matching user attributes of the user's user profile to user attributes of the query suggestion, and calculating a score for the query suggestion based at least in part on bias measures for one or more past queries submitted by the user (e.g., one or more of the most recently submitted queries) that are associated with the matched user attributes.

As described herein, in some implementations the ranking engine 125 of the suggestion system 120 may determine such one or more ranking signals for a query suggestion based on query attributes and bias measures database 158 and user attributes and submitted queries database 156. In some implementations, the ranking engine 125 may utilize such one or more determined ranking signals for a query suggestion in determining an initial ranking for the query suggestion. In some implementations, the ranking engine 125 may utilize other ranking signals for a query suggestion in determining an initial ranking for the query suggestion, and may adjust (promote or demote) the ranking for the query suggestion based on such one or more determined ranking signals. In some implementations, information from query attributes and bias measures database 158 may be included in the query suggestions database 160. For example, an entry for a query suggestion in query suggestions database 160 may include identifiers of query attributes and associated bias measures for that query suggestion. Additional description is provided below regarding ranking signals for a query suggestion of a query that include information about the relationship between one or more user attributes associated with the user entering the query and one or more user attributes associated with the query suggestion.

As also described herein, the ranking engine 125 of the suggestion system 120 may also rank query suggestions based on other ranking signals in addition to the bias measures. For example, other ranking signals for a query suggestion for a query may each provide, for example, information about the query suggestion and/or information about the relationship between the query and the query suggestion. A ranking signal that includes information about the query suggestion may include, for example, a measure of the popularity of the query suggestion, a measure of quality of the query suggestion, a language of the query suggestion, a measure of the length of the query suggestion, etc. A ranking signal that includes information about the relationship between the query and the query suggestion may include, for example, a measure of the popularity of the query suggestion for the query, a similarity measure between the query and the query suggestion, etc. Additional and/or alternative ranking signals may be utilized to determine a ranking for a query suggestion.

The search system 102 can also be implemented in one or more computers that communicate, for example, through a network. The search system 102 is an example of an information retrieval system with which systems, components, and techniques described herein may interface and/or in which the systems, components, and techniques described herein may be implemented. In some implementations, the suggestion system 120 and the search system 102 may both be provided and optionally communicate with one another as described in examples herein. In some implementations, the suggestion system 120 may operate independently of the search system 102. For example, the suggestion system 120 may provide suggestions in response to input provided by the client device 106 that is not input for an information retrieval system such as the search system 102. As one example, the suggestion system 120 may provide suggestions in response to input of a user within an entry field of a messaging application, e-mail application, or other application, wherein the entry field is not a query entry field for an information retrieval system. Attributes and bias measures associated with such suggestions may be determined based on techniques described herein and the suggestions may be ranked based on the bias measures as described herein.

A user may interact with the search system 102 via the client device 106. The search system 102 receives search queries from the client device 106 and returns search results to the client device 106 in response to the search queries. Each search query is a request for information. The search query can be, for example, in a text form and/or in other forms such as, for example, audio form and/or image form. Other computer devices may submit search queries to the search system 102 and/or the suggestion system 120 such as additional client devices and/or one or more servers implementing a service for a website that has partnered with the provider of the search system 102. For brevity, however, the examples are described in the context of the client device 106.

The client device 106 may be a computer coupled to the search system 102 and/or suggestion system 120 through one or more networks 101 such as a local area network (LAN) or wide area network (WAN) (e.g., the Internet). The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. The client device 106 typically includes one or more applications to facilitate formulation and submission of search queries and the sending and receiving of data over a network. For example, the client device 106 may execute one or more applications, such as a browser 107, that allow users to formulate queries and submit the queries to the search system 102 and/or suggestion system 120.

One or more applications executing on the client device 106 may also provide partial queries being formulated by a user before the user has indicated completion of the queries. As described herein, the partial queries may be provided, directly or indirectly, to the suggestion system 120. The applications may be, for example, the browser 107, a toolbar running in the browser 107, an email application, a mapping application, a text messaging application, and/or a search client running on the client device 106. In some implementations, the applications provide each character of the query as it is typed or otherwise entered by the user. In some implementations, the applications provide multiple characters at a time, optionally following a pause by the user between character entries. For example, the user may provide spoken input as a query and the applications may provide multiple characters corresponding to one or more words of the spoken input.

A partial query is a query formulated by a user prior to an indication by the user that the query is a completed query. In some implementations, a user may indicate a completed query by entering a carriage return and/or other character. In some implementations, a user may indicate a completed query by selecting a search button or other submission button in a user interface presented to the user. In some implementations, a user may indicate a completed query by speaking a command in a speech user interface. In some implementations, a user may indicate a completed query by pausing more than a threshold amount of time during entering of the query. Other forms of providing a partial query and/or indicating a completed query may additionally and/or alternatively be utilized.

In response to a partial query entered by a user, the client device 106 may facilitate entry of user input by providing suggested inputs to the user. For example, when the user enters one or more characters, the client device 106 can provide query suggestions that are selected based on the one or more characters. In some implementations, the query suggestions may be provided by the suggestion system 120 to the client device 106 for presentation to the user by the client device 106. The query suggestions that are provided may include words or phrases that include one or more of the characters that were entered by the user. For example, complete words or extended phrases can be suggested for partial words or partial phrases that a user has entered (e.g., spoken or entered using a physical or virtual keyboard). The query suggestions can also include words or phrases that are similar to (e.g., synonyms or spelling corrections of) the user input. One or more of the query suggestions may be a query suggestion that is ranked based on an overall bias measure for the query suggestion as described herein. For example, the display position of a query suggestion among a plurality of displayed query suggestions may be determined based at least in part on a ranking based on the overall bias measure for the query suggestion as described herein. Also, for example, the query suggestion may be selected for presenting to the user from a larger set of potential query suggestions based at least in part on a ranking based on the overall bias measure for the query suggestion as described herein.

The user can interact with (e.g., tap, click, speak a command, or otherwise affirmatively select) one of the provided query suggestions to, for example, submit the selected query suggestion as a completed search query or enter the text of the selected query suggestion for further modification of the selected query suggestion. In some implementations the client device 106 may permit multiple query suggestions to be included in a single search query (e.g., prior to a user indication that the search query is complete). For example, a user interface of the client device 106 may allow a user to select multiple query suggestions in succession, allowing the user to build a search query one word or one phrase at a time. A phrase can include one or more words. When the user selects multiple query suggestions, the query can include each of the selected query suggestions in the sequence that they were selected. As an example, when a user selects a query suggestion, the selected query suggestion is added to the partial query, forming an extended query. The client device 106 then receives new query suggestions from the suggestion system 120 and presents the new query suggestions for the extended query. By selecting one of the new query suggestions, the user can add it to the extended query, and can continue to add additional query suggestions (or other input) until the user indicates that the query is complete.

Figure 9:
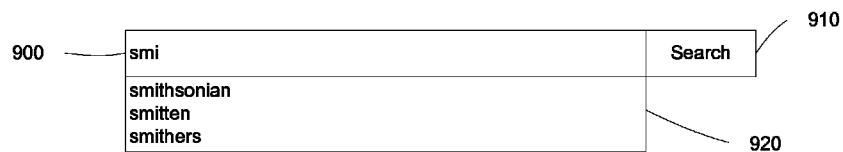
FIG. 9 is an example of a user interface for displaying query suggestions.

In some implementations, the query suggestions may be displayed to a user in a user interface of the client device 106. For example, the query suggestions may be displayed within a cascaded drop down menu of the search field of an application, such as the browser 107, as the user is typing the query. As described herein, the ranking of the query suggestions based on the overall bias measures of the query suggestions may be utilized to determine which query suggestions are selected for display in the drop down menu and/or to determine a display order of the query suggestions in the drop down menu. One example user interface for displaying query suggestions is illustrated in FIG. 9 and described in more detail herein.

In some implementations, in response to a partial query being entered at client device 106, the search system 102 may receive the partial query and forward the partial query to the suggestion system 120. In some implementations, in response to a partial query being entered at client device 106, the one or more applications executing on the client device 106 may optionally directly provide the partial query to the suggestion system 120 via network 101.

The suggestion system 120 may identify a plurality of query suggestions that are an appropriate match to the partial query. In some implementations, the suggestion system 120 may identify query suggestions from a query suggestions database 160 that includes one or more query suggestions and/or query templates. For example, the query suggestions database 160 may include a plurality of entries, with each entry identifying one or more query suggestions and including information to enable matching of the query suggestions to a partial query and/or a submitted query. For example, the query suggestions database 160 may include text of the query suggestions and suggestion system 120 may utilize prefix based and/or other matching techniques to match a partial query or submitted query to one or more query suggestions in the query suggestions database 160.

Also, for example, the query suggestions database 160 may include one or more query templates that each identify a template for generating a plurality of query suggestions and the suggestion system 120 may match a partial query to a query template and utilize the query template to determine one or more query suggestions that are an appropriate match to the partial query. For example, a query template may be "restaurants in [city]" and suggestion system 120 may utilize the query template to determine one or more query suggestions such as "restaurants in Chicago". The query suggestions may be determined based on the template utilizing, for example, the partial query (e.g., "Chicago" may be identified based on a partial query of "restaurants in C") and/or location information associated with the partial query and/or the user (e.g., "Chicago" may be identified based on location information associated with Chicago), and/or other factors. Additional and/or alternative techniques to identify one or more query suggestions may be utilized. In some implementations, the query suggestions may represent potential completed queries that may be provided to a user to enable the user to choose one of the query suggestions as a basis for utilization in a search or other information retrieval application.

In some implementations, the search system 102 and/or the client device 106 may optionally provide a completed query to the suggestion system 120. A completed query is a query that the user has indicated is complete. The suggestion system 120 may then match the completed query to one or more query suggestions to determine one or more query suggestions for the user's completed query. For example, one or more query suggestions may be determined based on techniques such as those described immediately above. The suggestion system 120 then provides these query suggestions to the client device 106 for presentation to the user. The query suggestions may, for example, be embedded within a search results web page to be displayed in an application, such as the browser 107, as potential further search options. For example, for a submitted query of "restaurants in Chicago", the suggestion system 120 may identify query suggestions such as "top restaurants in Chicago", "restaurant reviews in Chicago", etc. and provide those query suggestions to the client device 106 for display with a search results webpage for the submitted query.

The search system 102 may include an indexing engine and a ranking engine. The indexing engine maintains an index for use by the search system 102. The indexing engine processes documents and updates index entries in the index, for example, using conventional and/or other indexing techniques. A document is any data that is associated with a document identifier such as, but not limited to, a uniform resource locator ("URL"). Documents include web pages, word processing documents, portable document format ("PDF") documents, images, videos, e-mails, feed sources, executable applications such as mobile apps, calendar entries, task entries, to name just a few. Each document may include content such as, for example: text, images, videos, sounds, embedded information (e.g., meta information and/or hyperlinks); and/or embedded instructions (e.g., ECMAScript implementations such as JavaScript).

The ranking engine of the search system 102 uses the index to identify documents responsive to a search query, for example, using conventional and/or other information retrieval techniques. The ranking engine calculates scores for the documents identified as responsive to the search query, for example, using one or more ranking signals. Ranking signals may each provide, for example, information about the document itself, information about the search query, and/or information about the relationship between the document and the search query.

The ranking engine of the search system 102 ranks the responsive documents using the scores. The search system 102 uses the responsive documents ranked by the ranking engine to generate search results. The search results include search results corresponding to the documents responsive to the search query. For example, each of one or more search results can include a title of a respective of the documents, a link to a respective of the documents, and/or a summary of content from a respective of the documents that is responsive to the search query. The search results are transmitted to the client device 106 in a form that may be presented to the user. For example, the search results may be transmitted as a search results web page to be displayed via the browser 107 executing on the client device 106 and/or as one or more search results conveyed to a user via audio.

As described above, a ranking signal for a query suggestion for a query may include information about the relationship between one or more user attributes associated with the user entering the query and one or more user attributes associated with the query suggestion. The one or more user attributes of the user submitting the query may be identified from user attributes and submitted queries database 156. Also, in some implementations, the one or more user attributes of the query suggestion may be identified from the query attributes and bias measures database 158. As described herein, one or more of the user attributes of the query attributes and bias measure database 158 may be determined based on information from the user attributes and submitted queries database 156.

The user attributes and submitted queries database 156 may include one or more storage mediums. For each of a plurality of users, the user attributes and submitted queries database 156 may include an identifier of the user (e.g., a user ID or other identifier) and identifiers of one or more user attributes associated with the user. For example, user attributes of a user may be stored as a vector of user attributes that are associated with the user. For each of a plurality of users, the user attributes and submitted queries database 156 may also include query identifiers each identifying one or more queries submitted by the user and optionally identifying a submission measure indicative of a quantity of submissions of the queries associated with the query identifier. For example, query identifiers of a user may be stored as a vector of query identifier, submission measure pairs that are associated with the user. In some implementations, query identifiers and submission measures for the query identifiers of users may be provided in a database separate from a database including the user attributes of the users.

In some implementations, access to user attributes and/or query identifiers of a user in the user attributes and submitted queries database 156 may be allowed for only the user and/or one or more other users or components authorized by the user such as ranking engine 125, query attributes engine 130, and/or user attributes engine 140. In some implementations, each user may have control over whether and/or which user attributes and/or query identifiers of the user may be provided for inclusion in the user attributes and submitted queries database 156. In some implementations, each user may have control over whether and/or how user attributes and/or query identifiers of the user included in the user attributes and submitted queries database 156 are utilized in ranking query suggestions. In some implementations, each user may have the ability to remove user attributes and/or query identifiers of the user included in the user attributes and submitted queries database 156.

In some implementations, the user attributes engine 140 may determine one or more of the user attributes of the user attributes and submitted queries database 156 based on information in an indicated interactions database 152. Indicated interactions database 152 may include one or more storage mediums and, for each of a plurality of users, include identifiers of indicated interactions of the users such as indicated interactions with documents and/or locations. For example, for each of a plurality of users, identifiers of documents interacted with by the user via one or more computing devices such as client device 106 and/or other computing device(s) of the user may be included in the indicated interactions database 152. Interactions with documents by a user may occur via one or more applications executable on the client device 106 and/or other computing device(s), such as browser 107, an e-mail application, a social networking application, a photo viewing application, etc. For example, a user may interact with an e-mail document via an e-mail application, may interact with a video document via a video viewing application, and/or may interact with a mobile app document via an application that locates and/or installs mobile apps. Interactions with locations by a user may be identified via one or more applications executable on the client device 106 and/or other computing device(s). For example, a user may enable reporting of locations visited by the user via an application that provides an indication of the user's location via GPS or otherwise. Also, for example, a user may indicate a visit to a location via a social networking application or other application (e.g., "checking in" to the location). In some implementations, one or more identifiers of users, documents, and/or locations that may be included in the indicated interactions database 152 may be anonymized.

Indicated interactions database 152 may also include, for each document or location indicated as interacted with, an indication of the quantity of interactions with the document or location. For example, indicated interactions database 152 may include, for a given user, identifiers of documents selected by the user in response to search queries issued by the user, and, for each document, an indication of the number of selections of the document by the user. For example, the search system 102 may provide information related to documents selected by the user in response to search queries of the user and the information may be stored in indicated interactions database 152. Indicated interactions database 152 may also include, for each document or location indicated as interacted with, additional details about the interaction such as an indication of the time, date, and/or location of the interaction. For example, for an indicated interaction with a document, a time and date of interaction may be included, as well as a location of the user during the interaction.

In some implementations, indicated interactions database 152 may additionally and/or alternatively include information related to documents indicated as interacted with by the user via one or more applications besides the search system 102. For example, an identifier of a document indicated as interacted with by the user may be based on a webpage document visited by the user via browser 107 and/or other application—without necessarily being visited in response to a query. Also, for example, an identifier of a document indicated as interacted with by the user may be based on a calendar entry document created in response to input of the user via a calendar application and/or other application. Also, for example, an identifier of a document indicated as interacted with by the user may be based on an image, a post, and/or other documents viewed by a user via a social networking application and/or other application. The browser 107 and/or other applications (executing on the client device 106 or remotely) may optionally provide information related to the interacted with documents with permission of the user.

In this specification, the term "database" and "index" will be used broadly to refer to any collection of data. The data of the database and/or the index does not need to be structured in any particular way and it can be stored on storage devices in one or more geographic locations. Thus, for example, the databases 152, 154, 156, 158, and/or 160 may each include multiple collections of data, each of which may be organized and accessed differently. Also, for example, all or portions of the databases 152, 154, 156, 158, and/or 160 may be combined into one database and/or may contain pointers and/or other links between entries in the database(s).

With reference to FIGS. 2 and 3, examples are provided of determining user attributes of a user based on a set of documents indicated as interacted with by the user. FIG. 2 is a flow chart illustrating an example method of determining attributes for a user based on a set of documents indicated as interacted with by the user. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the user attributes engine 140 of FIG. 1.

At step 200, a set of documents indicated as interacted with by a user is identified. In some implementations, the user attributes engine 140 may identify the set of documents from the indicated interactions database 152. For example, the indicated interactions database 152 may include, for the user, identifiers of documents selected by the user in response to search queries issued by the user, and, for each document, an indication of the number of selections of the document by the user. For example, document D1 may have been selected by the user: thirty times in response to a first query Q1, ten times in response to a second query Q2, and ten times in response to a third query Q3. One or more aspects of the queries Q1-Q3 may be unique from one another. For example, each of the queries Q1-Q3 may include one or more terms that are unique from terms of the other queries. As one example, document D1 may be a document related to a widget store in San Francisco and: query Q1 may be "Widgets in San Francisco"; query Q2 may be "Businesses in California"; and query Q3 may be "Where can I buy widgets?". In some implementations, the search system 102 may provide information related to selection of document D1 by the user in response to the queries Q1, Q2, and Q3 and the information may be stored in indicated interactions database 152. For example, the indicated interactions database 152 may include an identifier of document D1 such as a URL or other identifier, and an indication of the quantity of indicated interactions with document D1 such as the number 50.

In some implementations, all documents indicated as interacted with by a user are identified for inclusion in the set of documents identified at step 200. In some other implementations, the set is restricted to a subset of documents based on one or more criteria. For example, in some implementations the set may be restricted to documents indicated as interacted with in a certain time period such as within the last 6 months. Also, for example, in some implementations the set may be restricted to the X documents indicated as interacted with the greatest quantity of times by the user. For example, the 200 documents indicated as interacted with the greatest quantity of times may be selected for inclusion in the set. Also, for example, in some implementations the set may be restricted to documents that are indicated as interacted with at least X times by the user. Also, for example, in some implementations the set may be restricted to documents that are associated with a white-list of documents such as the 300,000 documents interacted with the greatest amount by a set of users such as all users. Additional and/or alternative criteria may optionally be utilized to restrict the set.

With reference to FIG. 3, an example of a set of indicated interactions 152A of a user is provided. The set of indicated interactions 152A is an example of a set of indicated interactions from the indicated interactions database 152 and are all associated with one user. The indicated interactions 152A include documents $D_1$-$D_5$ and indications of the quantity of interactions with each of the documents (e.g., 50 interactions with document $D_1$). Although five documents are illustrated in the example of FIG. 3, it is understood that more or fewer indicated interactions with documents may be included for a user. The indicated interactions 152A also include document attributes $A_1$-$A_4$, described in more detail with respect to step 205. In some implementations, the document attributes $A_1$-$A_4$ may be omitted from the indicated interactions 152A.

At step 205, one or more attributes are identified for each of the documents of the set of documents identified at step 200. Generally, an attribute of a document is one or more features of the document that identify the document, that identify content associated with the document, and/or that identify features related to interactions with the document. In some implementations, a feature that identifies the document may include one or more identifiers such as a URL of the document (e.g., "www.exampleurl.com/document1"), a domain at which the document is hosted (e.g., "www.exampleurl.com"), and/or other identifier of the document (e.g., a unique alphanumeric identifier that is not a URL). In some implementations, a feature that identifies content associated with the document may include one or more entities associated with the document. An entity associated with a document may include, for example, a topic associated with the document (e.g., news, sports, technology news, Olympic sports), a site cluster to which the document belongs (e.g., a technology blogs cluster, an Olympics sports blogs cluster), and/or entities discussed in the document (e.g., the most prominent entity, the X most prominent entities, entities discussed with at least a threshold level of prominence). In some implementations, a feature related to interactions with the document may include information related to one or more users who interacted with the document, times and/or dates of interaction with the document, a location from which the document was interacted with, applications used to access the document, and/or other features related to interactions with the document but not necessarily determinable directly from the document. In some implementations, an identified attribute may be a single attribute, such as a single document identifier or single entity. In some implementations, an identified attribute may be a pair or other n-tuple of attributes. For example, an identified attribute for a document may be a pair of a topic associated with the document and a site cluster to which the document belongs. Also, for example, an identified attribute for a document may be a pair of a topic associated with the document and an application used to access the document.

In some implementations, the indicated interactions database 152 may include, for each of one or more documents, identifiers of one or more attributes for the document. For example, the indicated interactions 152A each include a document attribute ($A_x$) associated with the document. In some implementations, the user attributes engine 140 may determine an entity and/or other attribute that is associated with a document by referencing a database that contains information related to one or more entities or other attributes associated with a document. For example, the user attributes engine 140 may determine an identifier of the document and utilize the identifier as an attribute of the document. Also, for example, an entity database may include entries that associate each of one or more documents with a respective one or more entities associated with the document. For example, for each of a plurality of documents, a mapping (e.g., data defining an association) between the document and one or more entities associated with the document may be identified in the entity database. In some implementations entities are topics of discourse. In some implementations, entities are persons, places, concepts, and/or things that can be referred to by a text fragment (e.g., a term or phrase) and are distinguishable from one another (e.g., based on context). For example, the text "bush" on a webpage may potentially refer to multiple entities such as President George Herbert Walker Bush, President George Walker Bush, a shrub, and the rock band Bush. In some implementations, an entity may be referenced by a unique entity identifier that may be used to identify the entity. In some examples in this specification, an entity may be referenced with respect to a unique entity identifier. In some other examples, the entity may be referenced with respect to one or more alias and/or other property of the entity.

In some implementations, a document may only be mapped to a single entity. For example, the document may only focus on the single entity and/or the single entity may be determined to be more important to the document than one or more other entities. In some implementations, a document may be mapped to multiple entities. In some of those implementations scores may be associated with the multiple entities and the scores may indicate the strength of the association of the entity to the document. For example, scores from 0 to 1 may be associated with each of the entities, with 1 being most indicative of association of the entity to the document. In some implementations, an association between a document and an entity may be based on presence of one or more properties of the entity in the document. For example, an association between a document and an entity may be based on an importance of one or more alias of the entity in the document. For example, appearance of an alias of an entity in important fields and/or with great frequency in a document may be indicative of association of the entity to the document. Also, for example, an association between a document and an entity may be based on presence of additional and/or alternative properties of an entity such as date of birth, place of birth, height, weight, population, geographic location(s), type of entity (e.g., person, actor, location, business, university), etc. In some implementations, an association between a document and an entity may be based on presence in the document of one or more other entities related the entity.

At step 210, one or more of the attributes identified at step 205 are associated with the user. In some implementations, all of the attributes identified at step 205 are associated with the user. In some other implementations, the attributes identified at step 205 that are associated with the user are restricted to a subset of attributes based on one or more criteria. For example, in some implementations only attributes associated with the greatest number of indicated interactions may be utilized. In some implementations, a weight may optionally be associated with one or more of the attributes that are associated with the user. In some of those implementations, the weight of an attribute may be based at least in part on a measure of indicated interactions with documents associated with the attribute. For example, the weight may be the number of indicated interactions with the documents and/or may be the number of indicated interactions compared to another quantity of indicated interactions—such as all indicated interactions of the user. In some of those implementations, the weight of an attribute may additionally and/or alternatively be based at least in part on optional weight(s) of the attribute for the documents associated with the attribute. In some of those implementations, the weight of an attribute may be based at least in part on overall popularity measures of one or more documents associated with the attribute. For example, indicated interactions associated with relatively unpopular documents may contribute more heavily to the weight of an attribute than indicated interactions associated with relatively popular documents.

With reference to FIG. 3, an example of a set of user attributes 156A associated with a user is provided. The set of user attributes 156A is an example of user attributes from the user attributes and submitted queries database 156 and the user attributes 156A are all associated with one user. The user attributes 156A are determined based on the indicated interactions 152A of FIG. 3. The indicated user attributes 156A include attributes $A_1$-$A_4$ and weights for each of the attributes (e.g., a weight of 50 for attribute $A_1$). It is noted that attribute $A_4$ includes a weight that is based on indicated interactions with document $D_4$ and document $D_5$, which are both associated with the attribute $A_4$. Although four attributes and associated weights are illustrated in the example of FIG. 3, it is understood that more or fewer attributes may be included for a user. In some implementations, the weights for user attributes may be omitted. Also, in some implementations one or more user attributes may be associated with a user that are not determined based on documents indicated as interacted with by a user. For example, in some implementations, a user may also be associated with additional and/or alternative attributes determined from other sources such as user input. For example, the user may provide the user's gender and/or enable discovery of the user's location and such attributes may also be associated with the user.

The steps of FIG. 2 may be repeated for each of a plurality of users to determine attributes for each of the users, and to associate the determined attributes with the users. In some implementations, the steps of FIG. 2 and/or other steps may be performed on a periodic or other basis to update user attributes associated with users. Although FIGS. 2 and 3 discuss documents, in some implementations indicated interactions and/or user attributes may additionally and/or alternatively be based on indicated interactions with one or more locations as described herein. For example, an indicated interaction of a user may be an indicated visit to a physical location, one or more attributes for the physical location may be determined, and one or more of those attributes may be associated with the user.

In some implementations, the user attributes engine 140 may determine one or more of the query identifiers of the user attributes and submitted queries database 156 based on information in a submitted queries database 154. Submitted queries database 154 may include one or more storage mediums and, for each of a plurality of users, include identifiers of queries submitted by the user. For example, for each of a plurality of users, identifiers of queries submitted by the user via one or more computing devices such as client device 106 and/or other computing device(s) of the user may be included in the submitted queries database 154. Submissions of queries by a user may occur via one or more applications executable on the client device 106 and/or other computing device(s), such as browser 107, an e-mail application, a social networking application, a search client, etc. In some implementations, one or more identifiers of users and/or queries that may be included in the submitted queries database 154 may be anonymized. Submitted queries database 154 may also include, for each submitted query, an indication of the quantity of submissions of the query. For example, submitted queries database 154 may include, for a given user, query identifiers each identifying one or more queries submitted by the user, and, for each query identifier, an indication of the number of submissions of the one or more queries by the user. For example, the search system 102 may provide information related to queries submitted by the user and the information may be stored in submitted queries database 154.

In some implementations, submitted queries database 154 may additionally and/or alternatively include information related to queries submitted by the user via one or more applications besides the search system 102. For example, an identifier of a query submitted by the user may be based on a query submitted by the user to another information retrieval system besides the search system 102. For example, an identifier of a query submitted by the user may be based on search within an e-mail application, a social networking application, and/or other application. The browser 107 and/or other applications (executing on the client device 106 or remotely) may optionally provide information related to submitted queries with permission of the user.

With reference to FIG. 4, a flow chart is provided that illustrates an example method of determining query identifiers associated with a user based on a set of queries submitted by the user. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the user attributes engine 140 of FIG. 4.

At step 400, a set of queries submitted by a user is identified. In some implementations, the user attributes engine 140 may identify the set of queries from the submitted queries database 154. For example, the submitted queries database 154 may include, for the user, search queries submitted by the user, and, for each query, an indication of the number of submissions of the query by the user. For example, query Q1 may have been submitted by the user five times, query Q2 may have been submitted by the user four times, and query Q3 may have been submitted by the user three times. As one example, query Q1 may be "Widgets in San Francisco"; query Q2 may be "Widgets in San Fran"; and query Q3 may be "Chicago restaurants". In some implementations, the search system 102 may provide information related to submission of queries Q1, Q2, and Q3 by the user and the information may be stored in submitted queries database 154. For example, the submitted queries database 154 may include an identifier of query Q1 such as the text "widgets in san Francisco" or other identifier, and an indication of the quantity of submissions of query Q1 such as the number 5.

In some implementations, all queries submitted by a user are identified for inclusion in the set of queries identified at step 400. In some other implementations, the set is restricted to a subset of queries based on one or more criteria. For example, in some implementations the set may be restricted to queries submitted within a certain time period such as within the last 6 months. Also, for example, in some implementations the set may be restricted to the X queries submitted the greatest quantity of times by the user. For example, the 50 queries indicated as submitted the greatest quantity of times may be selected for inclusion in the set. Also, for example, in some implementations the set may be restricted to queries that are indicated as submitted at least X times by the user. Also, for example, in some implementations the set may be restricted to queries that are associated with a white-list of queries such as the 200,000 queries submitted the greatest number of times by a set of users such as all users. Additional and/or alternative criteria may optionally be utilized to restrict the set.

At step 405, one or more query identifiers are identified for each of the queries of the set of queries identified at step 400. Generally, a query identifier of a query is one or more features of the query that identify the query. In some implementations, a query identifier may identify a single query. For example, a query identifier may be the text of a single query. As one example, the query identifier for a query Q1 of "Widgets in San Francisco" may be "Widgets in San Francisco". In some implementations, a query identifier may identify a set of queries such as a set of queries that are related to one another. Queries may be determined to be related to one another, for example, based on similarity between the queries and/or similarity between search result documents for the queries. For example, a single query identifier of "widgets, san francisco" may be identified for a query Q1 of "Widgets in San Francisco" and a query Q2 of "Widgets in San Fran". Queries Q1 and Q2 may be determined to be related to one another based on similarity between the queries themselves and/or based on similarity between the search result documents responsive to the queries. In some implementations, a query identifier for a query may identify one or more features of the query. For example, continuing with the previous example, the query identifier for queries Q1 and Q2 may include the keywords "widgets" and "san francisco" and/or may include identifiers of entities associated with "widgets" and "san francisco"/"san Iran". In some implementations, the user attributes engine 140 may determine an entity and/or other feature that is associated with a query by referencing a database that contains information related to one or more entities or other features associated with a query. In some implementations, a query may only be mapped to a single entity. In some implementations, a query may be mapped to multiple entities. In some of those implementations scores may be associated with the multiple entities and the scores may indicate the strength of the association of the entity to the query. For example, scores from 0 to 1 may be associated with each of the entities, with 1 being most indicative of association of the entity to the query.

In some implementations, a feature of the query included in a query identifier may not be identifiable directly from the terms of the query. For example, a query identifier for the query "49ers city" may include an identifier of an entity associated with the city of San Francisco. The entity associated with the city of San Francisco may be identified as associated with the query "49ers city" based on, for example, a mapping of queries to associated entities in one or more databases and/or identification of entities associated with one or more search result documents for the query.

An entity associated with a query may include, for example, a topic associated with the query (e.g., cities, American cities, vacation destinations), a query cluster to which the query belongs (e.g., a navigational query cluster, a "how to" query cluster), and/or entities mentioned in the query and/or associated with the query (e.g., the most prominent entity, the X most prominent entities). In some implementations, a feature related to a query may additionally and/or alternatively include information related to times and/or dates of submission of the query, application(s) used to submit the query, and/or other features related to submissions of the query but not necessarily determinable directly from the query. In some implementations, an identified query identifier may be a single identifier, such as a single set of one or more terms or an identifier of a single entity. In some implementations, a query identifier may be a pair or other n-tuple of identifiers. For example, a query identifier for a query may be a pair of a keyword associated with the query and an entity associated with the query.

In some implementations, each query of the set identified at step 200 may be associated with only a single query identifier at step 205. For example, a query Q1 of "Widgets in San Francisco" may only be associated with a query identifier that identifies the keywords "widgets" and "san francisco". In some implementations, one or more queries of the set identified at step 200 may be associated with multiple query identifiers at step 205. For example, a query Q1 of "Widgets in San Francisco" may be associated with a query identifier that identifies the keywords "widgets" and "san francisco" and may also be associated with a query identifier that identifies the entity associated with the city San Francisco.

At step 410, the query identifiers identified at step 405 are associated with the user. In some implementations, all of the query identifiers identified at step 405 are associated with the user. In some other implementations, the query identifiers identified at step 405 that are associated with the user are restricted to a subset of query identifiers based on one or more criteria. For example, in some implementations only query identifiers associated with the greatest number of query submissions may be utilized. In some implementations, a weight may optionally be associated with one or more of the query identifiers that are associated with the user. In some of those implementations, the weight of a query identifier may be based at least in part on the quantity of submissions of queries associated with the query identifier. For example, the weight may be the number of submissions of the queries and/or may be the number of indicated submissions of the queries compared to another quantity of submissions—such as all indicated query submissions of the user. In some of those implementations, the weight of a query identifier may additionally and/or alternatively be based at least in part on optional weight(s) of any features of the query that are associated with the query identifier. For example, when a query identifier includes an identifier of an entity, the weight of the query identifier may be based at least in part on weights of the entity for one or more queries associated with the query identifier.

In some implementations, the query identifiers and associated weights may be associated with a user in the user attributes and submitted queries database 156. In some implementations, the query identifiers and associated weights may be associated with a user in a database separate from the user attributes and submitted queries database 156. The steps of FIG. 4 may be repeated for each of a plurality of users to determine query identifiers for each of the users, and to associate the determined query identifiers with the users. In some implementations, the steps of FIG. 4 and/or other steps may be performed on a periodic or other basis to update query identifiers associated with users.

As described above, ranking signals for a query suggestion may include information about the relationship between one or more user attributes associated with the user entering the query and one or more user attributes associated with the query suggestion for the query. For example, the ranking engine 125 may rank a query suggestion based on matching user attributes of the user's user profile to user attributes of the query suggestion, and ranking the query suggestion based at least in part on bias measures for the query suggestion that are associated with the matched user attributes and/or based at least in part on bias measures for one or more past queries submitted by the user (e.g., one or more of the most recently submitted queries) that are associated with the matched user attributes.

The one or more user attributes of the query suggestion may be identified from the query attributes and bias measures database 158. The query attributes and bias measures database 158 may include one or more storage mediums. For each of a plurality of query identifiers, the database 158 may include the query identifier and identifiers of one or more user attributes and associated bias measures associated with the query identifier. For example, a query identifier may be associated with a vector of user attribute, bias measure pairs. In some implementations, the query attributes engine 130 may determine one or more of the user attributes and bias measures of the database 158 based on user attributes and submitted queries database 156, indicated interactions database 152, and/or submitted queries database 154.

Figures 5, 6:
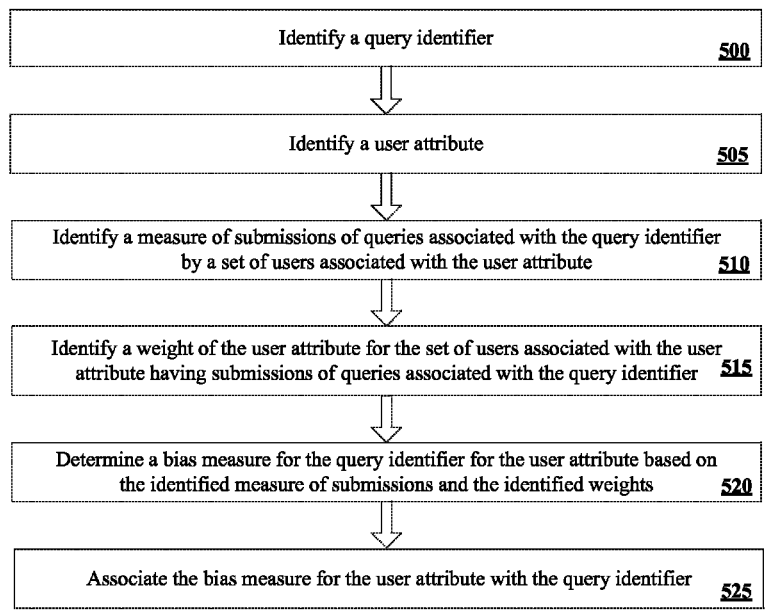
FIG. 5 is a flow chart illustrating an example method of determining a bias measure for a user attribute of a query identifier based on submissions of one or more queries related to the query identifier by a set of users having the user attribute.
FIG. 6 is an example of query identifiers and associated user attributes and bias measures.

With reference to FIGS. 5 and 6, examples are provided of determining a bias measure for a user attribute of a query identifier based on submissions of one or more queries related to the query identifier by a set of users having the user attribute. FIG. 5 is a flow chart illustrating an example method of determining a bias measure for a user attribute of a query identifier based on submissions of one or more queries related to the query identifier by a set of users having the user attribute. Other implementations may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, the query attributes engine 130 of FIG. 1.

At step 500, a query identifier is identified. For example, the query attributes engine 130 may identify a query identifier from the submitted queries database 154, the user attributes and submitted queries database 156, and/or other database. In some implementations, the query attributes engine 130 may identify only queries that are indicated as submitted by at least a threshold quantity of users (e.g., at least 50 users) and/or indicated as submitted at least a threshold quantity of times (e.g., at least 50 times by any quantity of users or by at least a threshold quantity of users). A quantity of submissions of a query and/or a quantity of users that have submitted a query may be determined, for example, based on submitted queries database 154 and/or the user attributes and submitted queries database 156. For example, data from user attributes and submitted queries database 156 may be utilized to determine a sum of submissions of queries among all users for each of the query identifiers of the user attributes and submitted queries database 156.

At step 505, a user attribute is identified. For example, the query attributes engine 130 may identify a user attribute from the user attributes and submitted queries database 156 and/or other database. In some implementations, the query attributes engine 130 may identify a user attribute based on the user attribute being associated with the query identifier of step 500 in user attributes and submitted queries database 156. For example, the user attributes of user attributes and submitted queries database 156 may each be mapped to one or more query identifiers reflecting queries submitted by users associated with the user attribute. For example, in some implementations the user attributes of database 156 may each include an identifier of the users with which they are associated and the users may each be associated with query identifiers reflecting queries submitted by such users. In some implementations, the user attribute may be a pair or other n-tuple of user attributes.

At step 510, a measure of submissions of queries associated with the query identifier identified at step 500 by a set of users associated with the user attribute identified at step 505 is identified. For example, the query attributes engine 130 may identify all users that are associated with the user attribute and associated with the query identifier from user attributes and submitted queries database 156. The query attributes engine 130 may then determine a measure of submissions of queries associated with the query identifier among users having the user attribute. For example, as described above, the query user attributes and submitted queries database 156 may include, for each user of the set of users, a weight associated with the query identifier for the user. The weight may be based at least in part on the quantity of submissions by the user of queries associated with the query identifier. For example, the weight may be a number that indicates the quantity of submission of queries associated with the query identifier by the user. Such weights may be utilized as the measure of submissions of queries associated with the query identifier. For example, in implementations where each of the weights is a number that indicates the quantity of submission by a user of queries associated with the query identifier, the measure may be based on the quantity of submissions among the set of users. For example, the measure may be represented as a vector, with each value in the vector indicating the quantity of submissions among one of the users of the set. Also, for example, the measure may be a sum, average, median, and/or other statistical measure of the quantity of submissions among the set of users. For example, the measure may be an average of the quantity of submissions among all users of the set of users.

At step 515, a weight of the user attribute is identified for the set of users associated with the user attribute identified at step 505 and having submissions of queries associated with the query identifier identified at step 500. For example, the query attributes engine 130 may identify all users that are associated with the user attribute and associated with the query identifier from user attributes and submitted queries database 156. The query attributes engine 130 may then determine weights of the user attribute for those users. For example, as described above, one or more user attributes associated with a user may be associated with a weight. For example, a weight for a user attribute determined based on indicated interactions of the user may be based on indicated interactions with one or more documents and/or locations associated with the user attribute. In some implementations, the weight for a user attribute for a user may be based on a quantity of interactions with one or more documents and/or locations associated with the user attribute by the user as compared to the quantity of interactions with a larger set of documents by the user, such as all documents. For example, the weight for a user attribute for a user may be based on the following equation:

Weight for user attribute=interactions (document(s), user attribute)/interactions (document(s));

wherein interactions (document(s), user attribute) indicates the quantity of indicated interactions by the user with the document(s) associated with the user attribute; and wherein interactions (document) indicates the quantity of indicated interactions by the user with another set of documents, such as all documents.

Such weights may be utilized as the weight of the user attribute for the set of users associated with the user attribute and having submissions of queries associated with the query identifier. For example, the weight may be represented as a vector, with each value in the vector indicating the weight for the user attribute for one of the users of the set. Also, for example, the weight may be a sum, average, median, and/or other statistical measure of the weights for the user attribute among the set of users. For example, the weight may be an average of the weights for the user attribute among all users of the set of users.

At step 520, a bias measure is determined for the query identifier for the user attribute. The bias measure is based on the measure of submissions of queries identified at step 510 and based on the identified weight of the user attribute identified at step 515. Generally, the bias measure for the query identifier for the user attribute indicates a likelihood of submission of a query identified by the query identifier by users having that user attribute. Generally, the likelihood of submission will increase as the number of submissions that are indicated by the measure of submissions of queries identified at step 510 increases and as the weight of the user attribute identified at step 515 increases (where a higher weight indicates stronger association of the attribute to the users). In some implementations, the bias measure may be determined based on comparison of the measure of submissions of queries identified at step 510 and the weight of the user attribute identified at step 515. For example, in implementations where the measure of submissions of queries identified at step 510 and the weight of the user attribute identified at step 515 are each vectors, the bias measure may be based on the dot product of the two vectors. Also, for example, in implementations where the measure of submissions of queries identified at step 510 and the weight of the user attribute identified at step 515 are each a statistical measure such as an average, the bias measure may be based on the product of the two measures.

In some implementations, the bias measure for a query identifier Q1 for a user attribute A may be based on the following equation:

(submissions (Q1,A))*((interactions (D1,A)/interactions (A)), wherein:
submissions (Q1, A)=quantity of submissions of queries associated with Q1 by users associated with attribute A (e.g., as identified at step 510);
interactions (D1, A)=quantity of interactions with one or more documents associated with the user attribute A (D1) by users associated with attribute A; and interactions (A)=quantity of interactions with all documents by users associated with attribute A (e.g., as identified at step 515).

Based on the preceding two equations, the larger the bias measure is, the stronger the association of the user attribute to the query identifier will be. Conversely, the smaller the bias measure is, the weaker the association of the user attribute to the query identifier will be. Other equations may be utilized wherein a larger bias measure indicates a weaker association of the user attribute to the query identifier and a smaller bias measure indicates a stronger association. Also, based on the preceding two equations, a bias measure for query identifier Q1 for a user attribute may take into account indicated interactions with one or more documents associated with the user attribute (interactions (D1,A)), including documents that may not be responsive to one or more queries identified by query identifier Q1 and/or otherwise related to one or more queries identified by query identifier Q1. In some implementations, step 515 may optionally be omitted and the bias measure may be determined at step 520 based on the measure of submissions identified at step 510, but independently of any weight of the user attribute for the set of users associated with the user attribute and having submissions of queries associated with the query identifier.

At step 525, the bias measure for the user attribute is associated with the query identifier. For example, the query attributes engine 130 may associate the bias measure and the user attribute with the query identifier in query attributes and bias measures database 158. In some implementations, the bias measure and the user attribute are only associated with the query identifier in database 158 if certain criteria are met. In some implementations, the criteria may be selected to retain those user attributes and bias measures that indicate the most meaningful bias for and/or against a query identifier. In other words, the criteria may be selected to retain those user attributes and associated bias measures that represent a significant bias for and/or against the query identifier. For example, in some implementations only the X highest bias measures and associated user attributes and/or the X lowest bias measures and associated user attributes may be retained. Also, for example, only the bias measures and associated user attributes that satisfy a threshold high value and/or only the bias measures and associated user attributes that fail to satisfy a threshold low value may be retained. Also, for example, in some implementations determined bias measures for user attributes for a query identifier may be normalized and only those user attributes and associated bias measures whose bias measures fall above and/or below a threshold may be retained. For example, only those user attributes and associated bias measures that are outside of one standard deviation of a mean bias measure may be retained. Additional and/or alternative criteria may be utilized.

In implementations where criteria are utilized to only associate certain user attributes and bias measures with a query identifier, one or more query identifiers may be associated with a set of user attributes that are unique from the user attributes of one or more other query identifiers. For example, for a first query identifier, a first set of fifty user attributes may represent a meaningful bias for and/or against the first query identifier; whereas for a second query identifier, a second set of fifty user attributes may represent a meaningful bias for and/or against the query identifier. The second set may include one or more user attributes that are unique from the first set.

The steps of FIG. 5 may be repeated for each of a plurality of additional user attributes to determine bias measures for each of the additional user attributes and optionally associate the additional user attributes and bias measures with the query identifier. Moreover, the steps of FIG. 5 may be repeated for each of a plurality of additional query identifiers to determine bias measures for user attributes for each of the additional query identifiers. In some implementations, the steps of FIG. 5 and/or other steps may be performed on a periodic or other basis to update user attributes and/or bias measures associated with query identifiers.

With reference to FIG. 6, an example of entries of query attributes and bias measures database 158 is provided. The entries include entries 1581, 1582, through 158X, with entries for multiple query identifiers being present between entries 1582 and 158X (but not illustrated for brevity). The example entry 1581 includes a query identifier of $Q_1$ and a set of user attributes and associated bias measures enclosed in brackets "< >". For example, user attribute $A_1$ has a bias measure of 0.8. The example entries 1582 through 158X likewise include query identifiers and a set of user attributes and associated bias measures. As described herein, in some implementations each of one or more of the user attributes $A_1$, $A_2$, etc. may be an identifier based on one or more documents interacted with by users. Thus, in those implementations the user attributes for a given query identifier may reflect documents interacted with by users submitting one or more queries associated with the query identifier—and the reflected documents may represent a bias for and/or against submission of the given query.

Figure 7:
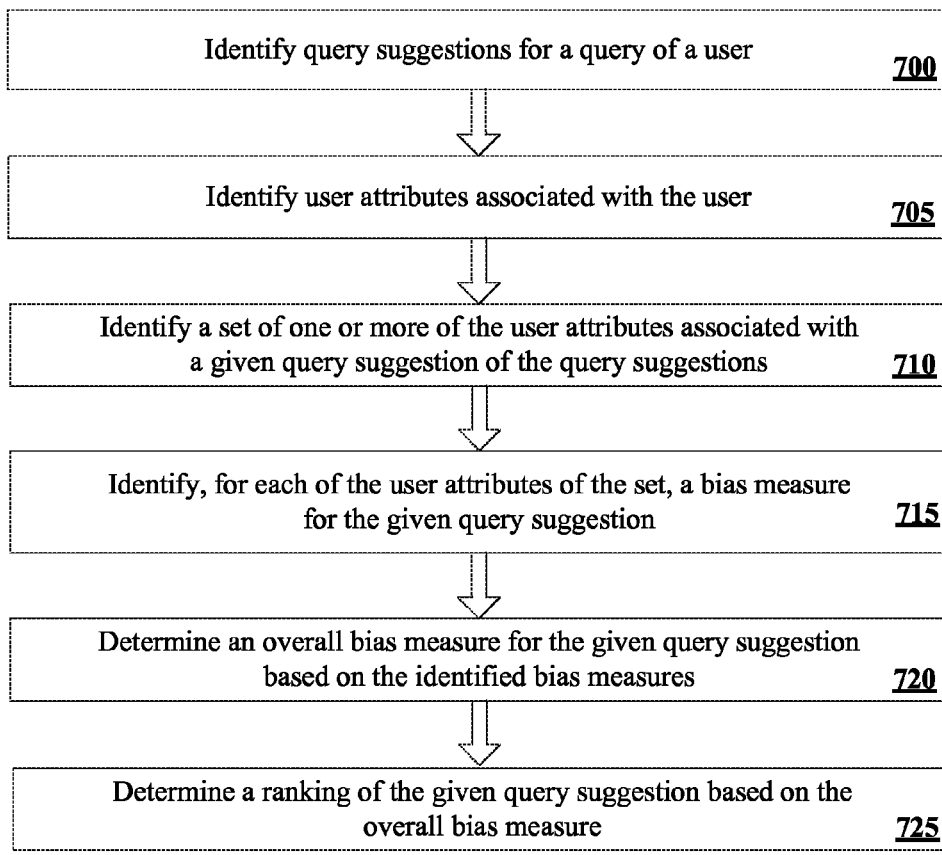
FIG. 7 is a flow chart illustrating an example method of ranking a query suggestion based on one or more user attributes of a user that are associated with the query suggestion.

FIG. 7 is a flow chart illustrating an example method of ranking a query suggestion based on one or more user attributes of a user that are associated with the query suggestion. Other implementations may perform the steps in a different order, omit certain steps, and/or perform different and/or additional steps than those illustrated in FIG. 7. For convenience, aspects of FIG. 7 will be described with reference to a system of one or more computers that perform the process. The system may include, for example, one or more components of the suggestion system 120 of FIG. 1 such as the ranking engine 125.

At step 700, a plurality of query suggestions for a query of a user are identified. In some implementations, the suggestion system 120 may receive the query, directly or indirectly, from the client device 106 and identify query suggestions for the query from query suggestions database 160. For example, the query suggestions database 160 may include a plurality of entries, with each entry identifying one or more query suggestions and including information to enable matching of the query suggestions to a partial query and/or a submitted query. In some implementations, the query is a completed submitted query of the user and the query suggestions are identified for the submitted query. In some implementations, the query is a partial query. For example, one or more applications executing on the client device 106 may provide a partial query being formulated by a user to suggestion system 120 before the user has indicated completion of the partial query.

In some implementations, the identified query suggestions may include n query suggestions for the query. For example, in some implementations the identified query suggestions may be the n most popular query suggestions that match the query. In some implementations, n may be selected to provide desired diversity of data, while maintaining desired performance. In some implementations, n may be adjusted as desired and may optionally be dependent on the parameters of the query. For example, in some implementations n may decrease as the length of the query increases.

At step 705, user attributes associated with the user that entered the query of step 700 are identified. For example, in some implementations the ranking engine 125 may identify user attributes associated with the user from the user attributes and submitted queries database 156. In some implementations, an identifier associated with the user may be utilized to identify user attributes associated with the identifier in the database 156. In some implementations, optional weights associated with the user attributes may also be identified. As one example, user attributes 156A of FIG. 3 may be user attributes identified for the user.

At step 710, a set of one or more of the user attributes are identified that are associated with a given query suggestion of the query suggestions identified at step 700. For example, the ranking engine 125 may determine, for a given query suggestion, a set of the user attributes that are associated with the given query suggestion. For example, the ranking engine 125 may identify, for the given query suggestion, a set of user attributes associated with the query suggestion from query attributes and bias measures database 158. As one example, user attributes of entry 1581 (FIG. 6) may be identified. The ranking engine 125 may identify those user attributes that are associated with the query suggestion that match the user attributes associated with the user and identified at step 705. Exact matching and/or soft matching between user attributes associated with the user and user attributes associated with the query suggestion may be utilized. As one example, user attributes $A_1$ and $A_2$ of entry 1581 match user attributes $A_1$ and $A_2$ of user attributes 156A.

In some implementations, the given query suggestion may only be associated with a single query identifier and the user attributes associated with that query identifier may be those identified. In some implementations, the given query suggestion may be associated with multiple query identifiers (e.g., a first query identifier may identify a first entity, keyword pair associated with the given query suggestion and a second query identifier may identify a second entity, keyword pair associated with the given query suggestion). In some of those implementations, the user attributes identified may be based on the users attributes associated with one or more of the multiple query identifiers. For example, only user attributes common to each of the multiple query identifiers may be identified, or all user attributes of the multiple query identifiers may be identified.

At step 715, a bias measure for the given query suggestion is identified for each of the user attributes of the set identified at step 710. For example, the ranking engine 125 may identify the bias measures from query attributes and bias measures database 158. As one example, user attribute $A_1$ of query entry 1561 has a bias measure of 0.8 and user attribute $A_2$ of query entry 1561 has a bias measure of 2.75. In implementations where the given query suggestion is associated with multiple query identifiers, the identified bias measures may be based on the bias measures for one or more of the multiple query identifiers. For example, where multiple query identifiers include bias measures for a given user attribute, all bias measures may be identified, an average of all bias measures may be identified, and/or the maximum and/or minimum bias measures may be identified.

At step 720, an overall bias measure for the given query suggestion is determined based on the bias measures identified at step 715. For example, the overall bias measure may be determined based on a maximum bias measure, a minimum bias measure, an average bias measure or other aggregate score based on the bias measures identified at step 715. As one example, an average of the bias measures of user attributes $A_1$ and $A_2$ of entry 1581 may be determined. In implementations in which weights for user attributes associated with a user are determined at step 710, the weights may optionally be utilized in determining an overall bias measure. For example, those bias measures associated with user attributes having a strong weight for a user may be weighted more heavily in an overall bias measure determination than those bias measures associated with user attributes having a weak weight for a user.

At step 725, a ranking of the given query suggestion is determined based on the overall bias measure determined at step 720. In some implementations, the ranking engine 125 may utilize other ranking signals for the given query suggestion in determining an initial ranking for the given query suggestion, and may adjust (promote or demote) the ranking for the given query suggestion based on the overall bias measure. In some implementations, the overall bias measure may be utilized in determining an initial ranking of the given query suggestion. Generally, an overall bias measure that indicates a strong likelihood of submission of the query may promote the ranking of the query suggestion, whereas an overall bias measure that indicates a weak likelihood of submission of the query may demote the ranking of the query suggestion.

In some implementations, one or more additional criteria may optionally be considered in determining whether to promote or demote the ranking of a query suggestion based on the overall bias measure. For example, in some implementations, in determining whether to promote the ranking of the given query suggestion based on the overall bias measure, the overall bias measure of the given query suggestion is compared to the overall bias measure of a more prominently ranked query suggestion that is more prominently ranked than the given query suggestion based on other ranking signals. The overall bias measure of a more prominently ranked document may be determined, for example, based on steps 710, 715, and 720. If the overall bias measure of the given query suggestion is more indicative of likelihood of submission than the overall bias measure of the more prominently ranked query suggestion, and if one or more other criteria are optionally met, the ranking of the given query suggestion may be promoted. In some implementations, the one or more other criteria may include that a ratio of the overall bias measure of the given query suggestion to the overall bias measure of the more prominently ranked query suggestion satisfies a threshold. For example, in some of those implementations the ratio must be greater than 1.4.

In some implementations, the one or more other criteria may include that a popularity measure and/or other ranking signal of the more prominently ranked query suggestion is below a threshold and/or that a comparison of a popularity measure of the given query suggestion and the popularity measure of the more prominently ranked query suggestion satisfies one or more thresholds. In some implementations, in determining the extent of promotion of the given query suggestion, the score for the given query suggestion (based on other ranking signals) may be compared to the score for the more prominently ranked query suggestion (based on other ranking signals), and the score for the given query suggestion boosted based on the comparison. For example, the score for the more prominently ranked query suggestion may be divided by the score for the given query suggestion to obtain a boost factor, and the score for the given query suggestion may boosted by multiplying the score for the given query suggestion by the boost factor. Other techniques may be utilized to promote and/or demote the given query suggestion.

In some implementations, in determining whether to demote the ranking of the given query suggestion based on the overall bias measure (e.g., when the overall bias measure is indicative of a bias against the given query suggestion), the overall bias measure of the given query suggestion is compared to the overall bias measure of a less prominently ranked query suggestion. If the overall bias measure of the given query suggestion is less indicative of likelihood of interaction than the overall bias measure of the less prominently ranked query suggestion, and if one or more other criteria are optionally met, the ranking of the given query suggestion may be demoted. In some implementations, the one or more other criteria may include that a ratio of the overall bias measure of the given query suggestion to the overall bias measure of the less prominently ranked query suggestion satisfies a threshold. For example, in some of those implementations the ratio must be less than 0.7.

One or more of the steps of FIG. 7 may be repeated for each of a plurality of additional query suggestion to determine rankings of those query suggestion based on the overall bias measures of those query suggestion. For example, one or more of the steps of FIG. 7 may be repeated for one or more of the n query suggestions identified at step 700, such as all query suggestions.

Query suggestions may be provided by the suggestion system 120 to the client device 106 that are selected based on the rankings of the query suggestions and/or ordered or annotated with display position criteria based on the rankings of the query suggestions. For example, the query suggestions that are selected to provide to the client device 106 may be a subset of the query suggestions identified at step 700 and may be selected based on the rankings of the query suggestions. Also, for example, the query suggestions may additionally and/or alternatively be ordered and/or annotated with display position criteria based on the rankings of the query suggestions. For example, the query suggestion corresponding to the highest ranked query suggestion may be ordered first and/or annotated with display position criteria to cause the client device 106 to present that query suggestion most prominently in a user interface. The suggestion system 120 may transmit the query suggestion to the client device 106, directly or indirectly (e.g., via search system 102) in a form that may be provided to the user. For example, the query suggestions may be transmitted as an ordered listing to be displayed in a user interface of one or more applications executing on the client device 106, such as in a drop down menu of a search page displayed via the browser 107. Also, for example, the query suggestions may be transmitted to the client device 106 to be conveyed to a user via audio.

Figure 8:
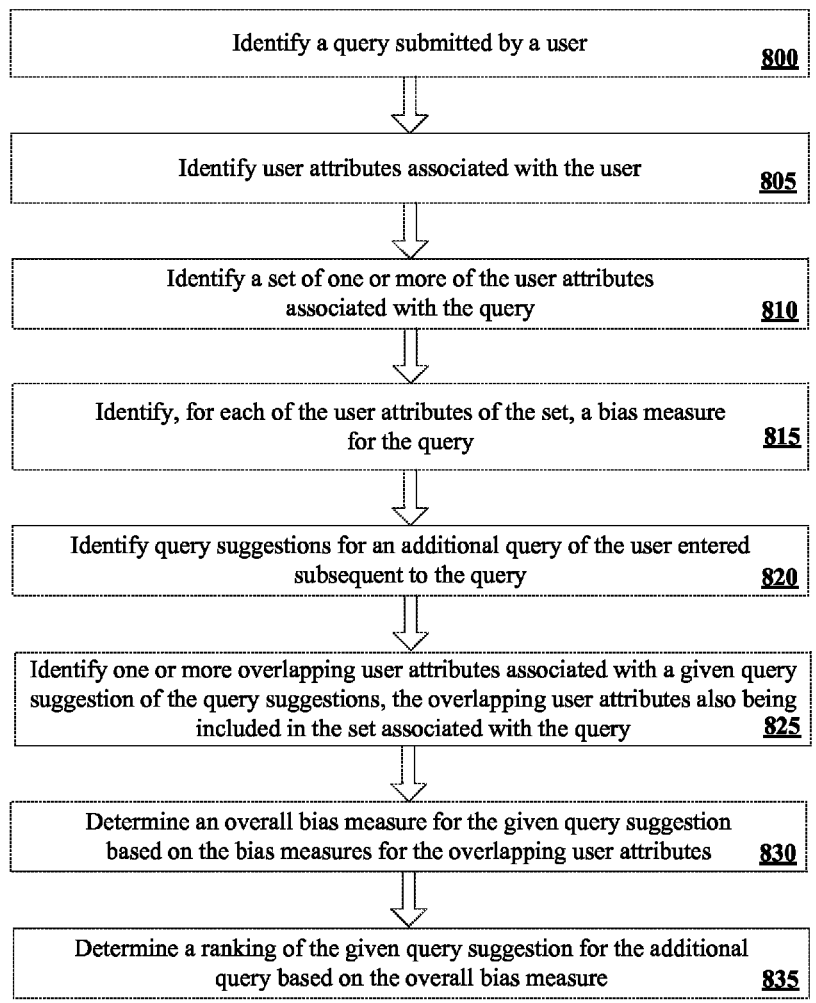
FIG. 8 is a flow chart illustrating another example method of ranking a query suggestion based on one or more user attributes of a user that are associated with the query suggestion.

FIG. 8 is a flow chart illustrating another example method of ranking a query suggestion based on one or more user attributes of a user that are associated with the query suggestion. As described in more detail below, the example method of FIG. 8 may be utilized to take into account user attributes and/or bias measures of one or more previously submitted queries of the user in ranking a query suggestion for an additional query of the user entered following the one or more previously submitted queries. Other implementations may perform the steps of FIG. 8 in a different order, omit certain steps, and/or perform different and/or additional steps than those illustrated in FIG. 8. For convenience, aspects of FIG. 8 will be described with reference to a system of one or more computers that perform the process. The system may include, for example, one or more components of the suggestion system 120 of FIG. 1 such as the ranking engine 125.

At step 800, a completed query submitted by a user is identified. In some implementations the search system 102 may receive the search query from a computing device such as client device 106 and provide the search query to suggestion system 120. In some implementations timestamp data and/or other information may be associated with the identified query.

At step 805, user attributes associated with the user that submitted the query of step 800 are identified. For example, in some implementations the ranking engine 125 may identify user attributes associated with the user from the user attributes and submitted queries database 156. In some implementations, an identifier associated with the user may be utilized to identify user attributes associated with the identifier in the database 156. In some implementations, optional weights associated with the user attributes may also be identified. As one example, user attributes of $A_{10}$, $A_{11}$, $A_{12}$, and $A_{13}$ may be user attributes identified for the user.

At step 810, a set of one or more of the user attributes are identified that are associated with the query identified at step 800. For example, the ranking engine 125 may determine a set of user attributes that are associated with the query from query attributes and bias measures database 158. The ranking engine 125 may identify those user attributes that are associated with the query that match the user attributes associated with the user and identified at step 805. Continuing with the working example, user attributes of $A_{10}$ and $A_{11}$ may be user attributes that are identified as associated with the query and matching the user attributes of $A_{10}$, $A_{11}$, $A_{12}$, and $A_{13}$. In some implementations, the query may only be associated with a single query identifier and the user attributes associated with that query identifier may be those identified. In some implementations, the query may be associated with multiple query identifiers. In some of those implementations, the user attributes identified may be based on the users attributes associated with one or more of the multiple query identifiers.

At step 815, a bias measure for the query is identified for each of the user attributes of the set identified at step 810. For example, the ranking engine 125 may identify the bias measures from query attributes and bias measures database 158. Continuing with the working example, a bias measure of 2.0 may be identified for user attribute $A_{10}$ and a bias measure of 1.8 may be identified for user attribute $A_{11}$. In implementations where the query is associated with multiple query identifiers, the identified bias measures may be based on the bias measures for one or more of the multiple query identifiers.

At step 820, a plurality of query suggestions for an additional query of the user are identified. The additional query is entered subsequent to the submission of the query at step 800. For example, the additional query may be a partial query that is formulated subsequent to the submission of the query at step 800 without any intervening queries. In some implementations, the additional query of step 820 and the query of step 800 may be identified to be a part of a query session of a user. Identifying two or more queries as part of a query session of a user may be based on one or more factors such as, for example, an amount of time between the entering and/or submission of the queries by the user (e.g., based on timestamp data), a number of intervening queries (if any) submitted by the user, etc.

In some implementations, the suggestion system 120 may receive the additional query, directly or indirectly, from the client device 106 and identify query suggestions for the additional query from query suggestions database 160. In some implementations, the query is a completed submitted query of the user and the query suggestions are identified for the submitted query. In some implementations, the query is a partial query. In some implementations, the identified query suggestions may include n query suggestions for the additional query. For example, in some implementations the identified query suggestions may be the n most popular query suggestions that match the additional query.

At step 825, one or more overlapping user attributes are identified for a given query suggestion of the query suggestions identified at step 820. The overlapping user attributes are associated with the given query suggestion and are also included in the set of user attributes identified at step 810. In other words, the overlapping user attributes are those that are associated with the query of step 800 and associated with the additional query of step 820.

In some implementations, the ranking engine 125 may determine, for the given query suggestion, a set of user attributes that are associated with the given query suggestion that match the user attributes associated with the user and identified at step 805. For example, the ranking engine 125 may identify, for the given query suggestion, a set of user attributes associated with the given query suggestion from query attributes and bias measures database 158. Continuing with the working example, user attributes $A_{10}$, $A_{11}$, $A_{14}$, and $A_{15}$ may be determined to be user attributes that are associated with the additional query of step 820 and that match the user attributes identified at step 805. The ranking engine 125 may also identify overlapping user attributes that are associated with the given query suggestion and that are also included in the set of 810. Continuing with the working example, user attribute $A_{10}$ and user attribute $A_{11}$ may be determined to be overlapping user attributes that are associated with both the query of step 800 and the additional query of step 820.

In some implementations, the given query suggestion may only be associated with a single query identifier and the user attributes associated with that query identifier may be those identified. In some implementations, the given query suggestion may be associated with multiple query identifiers. In some of those implementations, the user attributes identified may be based on the users attributes associated with one or more of the multiple query identifiers.

At step 830, an overall bias measure for the given query suggestion is determined based on the bias measures identified at step 815 for the overlapping attributes identified at step 825. In other words, the overall bias measure for the given query suggestion of the additional query of step 820 is determined based on one or more of the bias measures for the query of step 800. In implementations in which weights for user attributes associated with a user are determined at step 805, the weights may optionally be utilized in determining an overall bias measure. For example, those bias measures associated with user attributes having a strong weight for a user may be weighted more heavily in an overall bias measure determination than those bias measures associated with user attributes having a weak weight for a user.

Continuing with the working example, user attribute $A_{10}$ may have a bias measure of 2.0 for the query of step 800 and user attribute $A_{11}$ may have a bias measure of 1.8 for the query of step 800. The overall bias measure for the given query suggestion of step 820 may be determined based on the bias measures of 2.0 and/or 1.8.

As another example, a bias measure for the given query suggestion may be identified for each of the user attributes that are associated with the given query suggestion and the overall bias measure for the given query suggestion may also be based on one or more of those bias measures. For example, the ranking engine 125 may identify the bias measures from query attributes and bias measures database 158. Continuing with the working example: for the query of step 800 user attribute $A_{10}$ may have a bias measure of 2.0 and user attribute $A_{11}$ may have a bias measure of 1.8; and for the additional query of step 820 user attribute $A_{10}$ may have a bias measure of 1.5, user attribute $A_{11}$ may have a bias measure of 2.2, user attribute $A_{14}$ may have a bias measure of 0.8, and user attribute $A_{15}$ may have a bias measure of 1.3. The overall bias measure for the given query suggestion may be determined based on the bias measures of 2.0, 1.8, 1.5, 2.2, 0.8, and 1.3. For example, the overall bias measure may be a sum, average, and/or other statistical measure of the bias measures. In some implementations the bias measures for the query of step 800 may be weighted less heavily in determining the overall bias measure than the bias measures for the given query suggestion of the query of step 820. In some of those implementations, the weighting may decrease as the time interval between submissions of the query of step 800 and the entering of the additional query of step 820 increases, as the number of intervening queries between the query of step 800 and the additional query of step 820 increases, and/or based on other factors.

At step 835, a ranking of the given query suggestion is determined based on the overall bias measure determined at step 830. In some implementations, the ranking engine 125 may utilize other ranking signals for the given query suggestion in determining an initial ranking for the given query suggestion, and may adjust (promote or demote) the ranking for the given query suggestion based on the overall bias measure. In some implementations, the overall bias measure may be utilized in determining an initial ranking of the given query suggestion. Generally, an overall bias measure that indicates a strong likelihood of submission of the query may promote the ranking of the query suggestion, whereas an overall bias measure that indicates a weak likelihood of submission of the query may demote the ranking of the query suggestion.

FIG. 8 describes utilization of user attributes and bias measures from a single previously submitted query to influence an overall bias measure of a query suggestion of a subsequently submitted query. In some implementations user attributes and bias measures from multiple previously submitted queries may be utilized to influence an overall bias measure of a query suggestion of a subsequently entered query. For example, for a given query suggestion of a subsequently entered query, overlapping user attributes may be identified that match user attributes for one or more of two, three, or more previously submitted queries. Bias measures of the overlapping user attributes for the previously submitted queries may be utilized in determining an overall bias measure for the query suggestion. In some implementations, those bias measures for previously submitted queries more distant in time may be weighted less heavily than those bias measures for previously submitted queries more recent in time.

FIG. 9 is a partial screenshot that illustrates an example environment that can be used to provide query suggestions to a user. In FIG. 9, the partial screen shot includes a search field representation 900 and a search button representation 910. In this example, the user has entered the partial query "smi" into the search field representation and a drop down menu 920 of the search field is displayed. The drop down menu 920 includes three query suggestions "smithsonian", "smitten", and "smithers". The query suggestions may be those that are ranked (e.g., selected for display in the drop down menu 920 and/or ordered in the drop down menu 920) based on techniques described herein. The user may optionally choose any of the query suggestions and utilize the chosen suggestion as a completed query or the basis for a completed query to retrieve information. Additional and/or alternative displays may be provided. For example, the query suggestions may be arranged in one row and three columns below search field 900 or other text entry field.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 10:
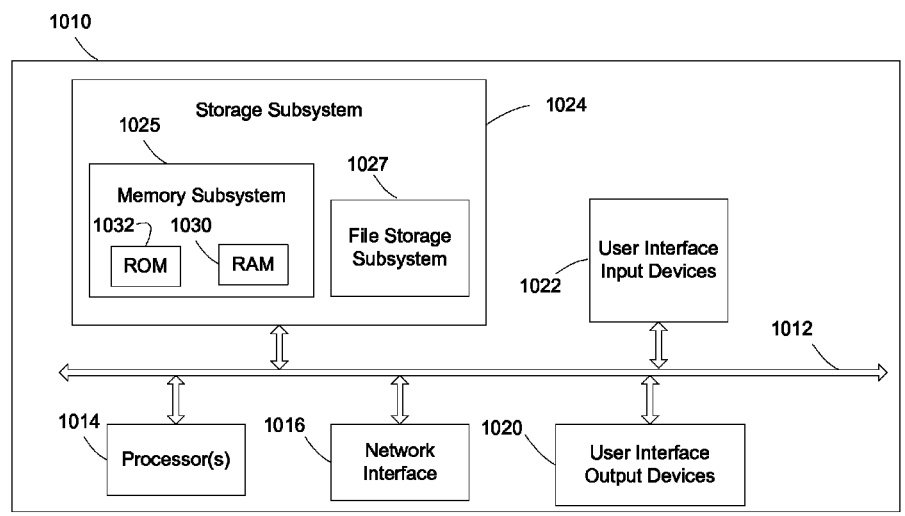
FIG. 10 illustrates an example architecture of a computer system.

The search system 102, the suggestion system 120, the query attributes engine 130, the user attributes engine 140, and/or one or more additional components of the example environment of FIG. 1 may each include memory for storage of data and software applications, a processor for accessing data and executing applications, and components that facilitate communication over a network. In some implementations, such components may include hardware that shares one or more characteristics with the example computer system that is illustrated in FIG. 10. The operations performed by one or more components of the example environment may optionally be distributed across multiple computer systems. For example, the steps performed by the suggestion system 120 may be performed via one or more computer programs running on one or more servers in one or more locations that are coupled to each other through a network.

Many other configurations are possible having more or fewer components than the environment shown in FIG. 1. For example, in some environments the ranking engine 125 may not be a separate module of the suggestion system 120. Also, for example, in some implementations information in the query attributes and bias measures database 158 may be included in the query suggestions database 160 and the bias measures database 158 may be omitted. Also, for example, in some implementations one or more of the components 130, 140, 152, 154, 156, and/or 158 may be included as part of the search system 102 and/or the suggestion system 120.

FIG. 10 is a block diagram of an example computer system 1010. Computer system 1010 typically includes at least one processor 1014 which communicates with a number of peripheral devices via bus subsystem 1012. These peripheral devices may include a storage subsystem 1024, including, for example, a memory subsystem 1025 and a file storage subsystem 1027, user interface input devices 1022, user interface output devices 1020, and a network interface subsystem 1016. The input and output devices allow user interaction with computer system 1010. Network interface subsystem 1016 provides an interface to outside networks and is coupled to corresponding interface devices in other computer systems.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the modules described herein. For example, the storage subsystem 1024 may include the logic to perform one or more of the methods described herein such as, for example, the methods of FIGS. 2, 4, 5, 7, and/or 8.

These software modules are generally executed by processor 1014 alone or in combination with other processors. Memory 1025 used in the storage subsystem can include a number of memories including a main random access memory (RAM) 1030 for storage of instructions and data during program execution and a read only memory (ROM) 1032 in which fixed instructions are stored. A file storage subsystem 1027 can provide persistent storage for program and data files, and may include a hard disk drive, a floppy disk drive along with associated removable media, a CD-ROM drive, an optical drive, or removable media cartridges. The modules implementing the functionality of certain implementations may be stored by storage subsystem 1024 in the file storage subsystem 1027, or in other machines accessible by the processor(s) 1014.

Bus subsystem 1012 provides a mechanism for letting the various components and subsystems of computer system 1010 communicate with each other as intended. Although bus subsystem 1012 is shown schematically as a single bus, alternative implementations of the bus subsystem may use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as a specific example for purposes of illustrating some implementations. Many other configurations of computer system 1010 are possible having more or fewer components than the computer system depicted in FIG. 10.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
identifying suggestions for an input of a user, each of the suggestions including one or more characters not present in the input;
identifying user attributes associated with the user;
identifying, for a given suggestion of the suggestions, a set of the user attributes that are each associated with the given suggestion;
identifying, for each of the user attributes of the set, a given suggestion bias measure for the given suggestion, wherein the given suggestion bias measure for a given user attribute of the set is based on a measure of submissions associated with the given suggestion by a set of users having indicated interactions associated with the given user attribute;
determining an overall bias measure for the given suggestion based on the given suggestion bias measures for the user attributes of the set;
determining a ranking of the given suggestion for the input based on the overall bias measure;
identifying a submission of the given suggestion by the user;
identifying additional suggestions for a second input of the user, wherein the second input is subsequent to the submission of the given suggestion;
identifying, for a second given suggestion of the additional suggestions, a second set of the user attributes associated with the user that are also each associated with the second given suggestion, wherein the user attributes of the second set include overlapping attributes that are included in both the set, associated with the given suggestion, and the second set, associated with the second given suggestion;
identifying, for each of the overlapping attributes, a second bias measure for the second given suggestion, wherein the second bias measures for the overlapping attributes vary from the given suggestion bias measures for the overlapping attributes;
determining a second overall bias measure for the second given suggestion, wherein the second overall bias measure is based on the second bias measures for the overlapping attributes and the given suggestion bias measures for the overlapping attributes, the given suggestion bias measures for the overlapping attributes being bias measures for the given suggestion and based on the measures of submissions associated with the given suggestion, and wherein the given suggestion bias measures are used based on the second input of the user being subsequent to the previously submitted given suggestion;
determining a ranking of the second given suggestion for the second input based on the second overall bias measure; and providing the second given suggestion for presentation as a suggestion for the second input, wherein providing the second given suggestion is based on the ranking.

2. The computer-implemented method of claim 1, wherein the bias measure for the given user attribute of the set is based on a measure of the indicated interactions associated with the given user attribute by the set of users.

3. The computer-implemented method of claim 2, wherein the given user attribute of the set is associated with one or more documents or locations and wherein the indicated interactions associated with the given user attribute includes interactions by the set of users with the one or more documents or locations.

4. The computer-implemented method of claim 3, wherein the measure of the indicated interactions is based on one or more popularity measures of the one or more documents or locations associated with the given user attribute.

5. The computer-implemented method of claim 3, wherein the measure of the indicated interactions by the set of users is based on comparison of the indicated interactions to additional indicated interactions, the additional indicated interactions including interactions with additional documents or locations that are not included in the one or more documents or locations.

6. The computer-implemented method of claim 1, wherein the given user attribute is included in the overlapping attributes, and wherein the second bias measure for the given user attribute is based on a measure of submissions associated with the second given suggestion by the set of users having the indicated interactions associated with the given user attribute.

7. The computer-implemented method of claim 1, wherein the second bias measures for the second given suggestion and the bias measures for the overlapping attributes are weighted evenly in determining the second overall bias measure for the second given suggestion.

8. The computer-implemented method of claim 1, wherein the second bias measures for the second given suggestion are weighted more heavily than the bias measures for the overlapping attributes in determining the second overall bias measure for the second given suggestion.

9. The computer-implemented method of claim 1, further comprising:
identifying, for a second suggestion of the suggestions, an additional set of one or more of the user attributes that are each associated with the second suggestion;
identifying, for each of the user attributes of the additional set, a second suggestion bias measure for the second suggestion;
determining a second suggestion overall bias measure for the second suggestion based on the second suggestion bias measures for the user attributes of the additional set; and
determining a ranking of the second suggestion based on the second suggestion overall bias measure.

10. The computer-implemented method of claim 9, wherein one or more of the user attributes of the set are not present in the additional set.

11. The computer-implemented method of claim 9, wherein the set and the additional set include one or more same of the user attributes.

12. The computer-implemented method of claim 1, wherein the input is a partial query.

13. A computer-implemented method, comprising:
identifying a submitted query submitted by a user;
identifying user attributes associated with the user;
identifying, for the submitted query, a set of the user attributes that are each associated with the submitted query;
identifying, for each of the user attributes of the set, a submitted bias measure for the submitted query, wherein the submitted bias measure for a given user attribute of the set is based on a measure of submissions associated with the submitted query by a set of users having the given user attribute;
identifying query suggestions for a second query of the user, wherein the second query is subsequent to the submitted query and wherein each of the query suggestions includes one or more characters not present in the submitted query;
identifying, for a given query suggestion of the query suggestions, a second set of the user attributes associated with the user that are also each associated with the given query suggestion, wherein the user attributes of the second set include overlapping attributes, the overlapping attributes being included in both the set, associated with the submitted query, and the second set, associated with the given query suggestion;
identifying, for each of the overlapping attributes, a given suggestion bias measure for the given query suggestion, wherein the given suggestion bias measures for the overlapping attributes vary from the submitted bias measures for the overlapping attributes;
determining an overall bias measure for the given query suggestion, wherein determining the overall bias measure is based on the given suggestion bias measures and the submitted bias measures for the overlapping attributes, the submitted bias measures for the overlapping attributes being bias measures for the submitted query and based on submissions associated with the submitted query, and wherein the submitted bias measures are used based on the second query of the user being subsequent to the previously submitted query;
determining a ranking of the given query suggestion for the second query based on the overall bias measure; and
providing the given query suggestion for presentation as a suggestion for the second query, wherein providing the given query suggestion is based on the ranking.

14. The computer-implemented method of claim 13, wherein a given user attribute of the set is associated with one or more documents and wherein the bias measure for the given user attribute of the set is based on a measure of indicated interactions by the set of users with the one or more documents.

15. The computer-implemented method of claim 14, wherein the measure of the indicated interactions by the set of users with the one or more documents is based on one or more popularity measures of the one or more documents.

16. The computer-implemented method of claim 14, wherein the measure of the indicated interactions by the set of users with the one or more documents is based on comparison of the indicated interactions to additional indicated interactions, the additional indicated interactions including interactions with additional documents that are not included in the one or more documents.

17. The computer-implemented method of claim 13, wherein the given user attribute is included in the overlapping attributes, and wherein the second bias measure for the given user attribute is based on a measure of submissions associated with the given query suggestion by the set of users having the given user attribute.

18. The computer-implemented method of claim 13, wherein the second bias measures for the given query suggestion and the bias measures for the overlapping attributes are weighted evenly in determining the overall bias measure for the given query suggestion.

19. The computer-implemented method of claim 13, wherein the second bias measures for the given query suggestion are weighted more heavily than the bias measures for the overlapping attributes in determining the overall bias measure for the given query suggestion.

20. The computer-implemented method of claim 13, wherein one or more of the user attributes of the set are not present in the second set.

21. The computer-implemented method of claim 13, wherein determining the overall bias measure based on the bias measures for the overlapping attributes is dependent on the second query and the submitted query being part of a query session.

22. A system, comprising:
hardware memory storing instructions; and
one or more hardware processors operable to execute the instructions stored in the hardware memory to:
identify suggestions for an input of a user, each of the suggestions including one or more characters not present in the input;
identify user attributes associated with the user;
identify, for a given suggestion of the suggestions, a set of the user attributes that are each associated with the given suggestion;
identify, for each of the user attributes of the set, a given suggestion bias measure for the given suggestion, wherein the given suggestion bias measure for a given user attribute of the set is based on a measure of submissions associated with the given suggestion by a set of users having indicated interactions associated with the given user attribute;
identify, for each of the overlapping attributes, a second bias measure for a second given suggestion, wherein the second bias measures for the overlapping attributes vary from the given suggestion bias measures for the overlapping attributes;
determine an overall bias measure for the given suggestion based on the given suggestion bias measures for the user attributes of the set;
determine a ranking of the given suggestion for the input based on the overall bias measure;
identify a submission of the given suggestion by the user;
identify additional suggestions for a second input of the user, wherein the second input is subsequent to the submission of the given suggestion;
identify, for a second given suggestion of the additional suggestions, a second set of the user attributes associated with the user that are also each associated with the second given suggestion, wherein the user attributes of the second set include overlapping attributes that are included in both the set, associated with the given suggestion, and the second set, associated with the second given suggestion;
determine a second overall bias measure for the second given suggestion, wherein the second overall bias measure is based on the second bias measures for the overlapping attributes and the given suggestion bias measures for the overlapping attributes, the given suggestion bias measures for the overlapping attributes being bias measures for the given suggestion and based on submissions associated with the given suggestion, and wherein the given suggestion bias measures are used based on the second input of the user being subsequent to the previously submitted given suggestion;
determine a ranking of the second given suggestion for the second input based on the second overall bias measure; and
provide the second given suggestion for presentation as a suggestion for the second input, wherein providing the second given suggestion is based on the ranking.

23. The system of claim 22, wherein the bias measure for the given user attribute of the set is based on a measure of the indicated interactions associated with the given user attribute by the set of users.

24. The system of claim 23, wherein the given user attribute of the set is associated with one or more documents or locations and wherein the indicated interactions associated with the given user attribute includes interactions by the set of users with the one or more documents or locations.

25. The system of claim 24, wherein the measure of the indicated interactions is based on one or more popularity measures of the one or more documents or locations associated with the given user attribute.

26. The system of claim 23, wherein the measure of the indicated interactions by the set of users is based on comparison of the indicated interactions to additional indicated interactions, the additional indicated interactions including interactions with additional documents or locations that are not included in the one or more documents or locations.

27. The system of claim 22, wherein the given user attribute is included in the overlapping attributes, and wherein the second bias measure for the given user attribute is based on a measure of submissions associated with the second given suggestion by the set of users having the indicated interactions associated with the given user attribute.

28. The system of claim 22, wherein the instruction further include instructions to:
identify, for a second suggestion of the suggestions, an additional set of one or more of the user attributes that are each associated with the second suggestion;
identify, for each of the user attributes of the additional set, a second suggestion bias measure for the second suggestion;
determine a second suggestion overall bias measure for the second suggestion based on the second suggestion bias measures for the user attributes of the additional set; and
determine a ranking of the second suggestion based on the second suggestion overall bias measure.

29. The system of claim 28, wherein one or more of the user attributes of the set are not present in the additional set.

30. A non-transitory computer readable storage medium storing computer instructions executable by a processor to perform a method comprising:
identifying suggestions for an input of a user, each of the suggestions including one or more characters not present in the input;
identifying user attributes associated with the user;
identifying, for a given suggestion of the suggestions, a set of the user attributes that are each associated with the given suggestion;
identifying, for each of the user attributes of the set, a given suggestion bias measure for the given suggestion, wherein the given suggestion bias measure for a given user attribute of the set is based on a measure of submissions associated with the given suggestion by a set of users having indicated interactions associated with the given user attribute;

determining an overall bias measure for the given suggestion based on the given suggestion bias measures for the user attributes of the set;

determining a ranking of the given suggestion for the input based on the overall bias measure;

identifying a submission of the given suggestion by the user;

identifying additional suggestions for a second input of the user, wherein the second input is subsequent to the submission of the given suggestion;

identifying, for a second given suggestion of the additional suggestions, a second set of the user attributes associated with the user that are also each associated with the second given suggestion, wherein the user attributes of the second set include overlapping attributes that are included in both the set, associated with the given suggestion, and the second set, associated with the second given suggestion;

identifying, for each of the overlapping attributes, a second bias measure for the second given suggestion, wherein the second bias measures for the overlapping attributes vary from the given suggestion bias measures for the overlapping attributes;

determining a second overall bias measure for the second given suggestion, wherein the second overall bias measure is based on the second bias measures for the overlapping attributes and the given suggestion bias measures for the overlapping attributes, the given suggestion bias measures for the overlapping attributes being bias measures for the given suggestion and based on submissions associated with the given suggestion, and wherein the given suggestion bias measures are used based on the second input of the user being subsequent to the previously submitted given suggestion;

determining a ranking of the second given suggestion for the second input based on the second overall bias measure; and providing the second given suggestion for presentation as a suggestion for the second input, wherein providing the second given suggestion is based on the ranking.

* * * * *